United States Patent
Lee et al.

(10) Patent No.: US 8,839,143 B2
(45) Date of Patent: Sep. 16, 2014

(54) APPARATUS AND METHOD FOR DISPLAYING IMAGE IN PORTABLE TERMINAL

(75) Inventors: Sin-Jae Lee, Suwon-si (KR); Young Cheul Wee, Suwon-si (KR)

(73) Assignees: Samsung Electronics Co., Ltd (KR); Quram Co., Ltd (KR)

( * ) Notice: Subject to any disclaimer, the term of this patent is extended or adjusted under 35 U.S.C. 154(b) by 1053 days.

(21) Appl. No.: 11/857,215

(22) Filed: Sep. 18, 2007

(65) Prior Publication Data

US 2008/0115089 A1  May 15, 2008

(30) Foreign Application Priority Data

Nov. 10, 2006 (KR) ........................ 10-2006-0110949

(51) Int. Cl.
- G06F 3/048 (2013.01)
- H04N 1/393 (2006.01)
- G09G 5/395 (2006.01)
- G09G 5/393 (2006.01)
- H04N 1/00 (2006.01)

(52) U.S. Cl.
CPC ......... H04N 1/3935 (2013.01); G09G 2340/02 (2013.01); G09G 5/395 (2013.01); G09G 5/393 (2013.01); G09G 2340/0407 (2013.01); H04N 1/0044 (2013.01)
USPC ...................................................... 715/800

(58) Field of Classification Search
USPC ........................................ 715/838, 864, 800
See application file for complete search history.

(56) References Cited

U.S. PATENT DOCUMENTS

| | | | |
|---|---|---|---|
| 4,800,379 A | 1/1989 | Yeomans | |
| 5,892,847 A | 4/1999 | Johnson | |
| 6,215,523 B1 * | 4/2001 | Anderson | 348/333.05 |
| 6,281,874 B1 | 8/2001 | Sivan et al. | |
| 2002/0000998 A1 | 1/2002 | Scott et al. | |
| 2007/0157102 A1 * | 7/2007 | Hasegawa et al. | 715/769 |

FOREIGN PATENT DOCUMENTS

| | | |
|---|---|---|
| JP | 4-292077 | 10/1992 |
| JP | 5-260311 | 10/1993 |
| JP | 2000-268163 | 9/2000 |
| JP | 2001-136371 | 5/2001 |
| JP | 2003-323456 | 11/2003 |
| JP | 2004-040674 | 2/2004 |
| KR | 1020050074034 | 7/2005 |
| KR | 1020060025259 | 3/2006 |
| KR | 1020080010598 | 1/2008 |

* cited by examiner

*Primary Examiner* — Thanh Vu
(74) *Attorney, Agent, or Firm* — The Farrell Law Firm, P.C.

(57) ABSTRACT

Provided are an apparatus and method for displaying an image in a portable terminal. The apparatus includes a display unit for displaying an image; a display buffer that stores the image to be displayed; a zoom buffer that temporarily stores an enlarged thumbnail to provide a better image quality; a memory that stores an original image of the thumbnail as a compressed image file; an interface unit that upon receiving an image enlargement request while the thumbnail is being displayed on the display unit, enlarges and stores the thumbnail, stored in the display buffer, in the zoom buffer, and sends an image quality improvement request to a decoder that continuously improves the image quality of the enlarged thumbnail stored in the zoom buffer by a predetermined amount.

18 Claims, 5 Drawing Sheets

APPARATUS AND METHOD FOR DISPLAYING IMAGE IN PORTABLE TERMINAL

PRIORITY

This application claims priority under 35 U.S.C. §119(a) to an application filed in the Korean Intellectual Property Office on Nov. 10, 2006 and assigned Serial No. 2006-110949, the contents of which are incorporated herein by reference.

BACKGROUND OF THE INVENTION

1. Field of the Invention

The present invention relates to an apparatus and method for displaying an image in a portable terminal, and in particular, to an apparatus and method for displaying an image whereby a user waiting time is reduced by separately performing a decoding operation from a user interface operation and whereby an image quality is improved by first displaying an enlarged thumbnail of an original image and then subsequently displaying the original image.

2. Description of the Related Art

Recently, portable terminals such as mobile phones or Personal Digital Assistants (PDAs) have become widely used. The portable terminals are generally used for telephone calls or schedule management. In addition, the portable terminals are also used for many other purposes. For example, still pictures or videos can be captured by using a digital camera included in a portable terminal. Further, the portable terminal provides a variety of functions such as watching a satellite broadcasting program, text editing, playing games, using a navigation function, listening to music, sending/receiving Short Message Service (SMS) messages, and transmitting/receiving a multimedia message attached with a captured still image or moving image.

In particular, with the development of a camera function and a display function, an image can be captured and displayed with a high resolution. To further this trend, a method of displaying an image in a portable terminal has been developed.

Conventionally, a high-resolution image is compressed before storing the image in a memory of a portable terminal. The compressed image may be decoded before being displayed on a display unit of the portable terminal. However, since the portable terminal generally has a small-sized display unit, before being displayed on the display unit, the decoded image is subject to an image size reduction process so that the size of the decoded image fits the screen of the small-sized display unit.

Since the image size reduction process has to be performed after the decoding process, the conventional method is time consuming and uses extra memory space. To address this problem, a relatively small-sized thumbnail is first displayed according to a predefined compression rule, and an original image of the thumbnail is decoded only when a user requests a high-resolution image. As a result of a decoding, the original image is enlarged to its maximum size and thereafter is stored in a memory. When displayed on the display unit, the decoded original image is resized to a requested image size.

However, a problem still remains in that a lot of time is required to decode the original image. Further, during the decoding process, the portable terminal cannot perform other tasks. Thus, a user command cannot be received while the decoding process is performed.

SUMMARY OF THE INVENTION

The present invention provides an apparatus and method for displaying an image in a portable terminal.

The present invention also provides an apparatus and method for displaying an image in a portable terminal, whereby a user interface operation and a decoding operation are performed separately and simultaneously.

The present invention also provides an apparatus and method for displaying an image in a portable terminal, whereby image quality is improved by first displaying an enlarged thumbnail of an original image and subsequently displaying the resized original image.

The present invention also provides an apparatus and method for displaying an image in a portable terminal, whereby image quality is improved by a predetermined amount in such a manner that an enlarged thumbnail of an original image is first displayed, and the resized original image is subsequently displayed.

According to one aspect of the present invention, there is provided an apparatus for displaying an image in a portable terminal, including a display unit for displaying an image; a display buffer in which the image to be displayed on the display unit is temporarily stored; a zoom buffer in which an enlarged thumbnail is temporarily stored to provide a better image quality; a memory in which an original image of the thumbnail is stored in the format of a compressed image file; an interface unit via which, upon receiving an image enlargement request while the thumbnail is being displayed on the display unit, the thumbnail stored in the display buffer is enlarged and stored in the zoom buffer, and via which an image quality improvement request is sent to a decoder so that the image quality is improved by decoding; and the decoder which continuously improves the image quality of the enlarged thumbnail stored in the zoom buffer by a predetermined amount until the image quality is completely improved when an image quality improvement request is received via the interface unit.

According to another aspect of the present invention, there is provided a method of displaying an image in a portable terminal, including upon receiving an image enlargement request, enlarging a thumbnail stored in a display buffer until an image size of the thumbnail reaches a maximum image size at which the image quality can be improved; storing the enlarged thumbnail in a zoom buffer; requesting a decoder to improve the image quality of the enlarged thumbnail; checking a requested image size when an image resize request is received from a user or when an image update request is received from the decoder; during or after performing a process of improving the image quality, resizing the enlarged thumbnail to the determined image size; storing the resized thumbnail in the display buffer; and displaying the resized thumbnail.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

The present invention provides an apparatus and method for displaying an image whereby a user waiting time is reduced by separately performing a decoding operation from a user interface operation and whereby an image quality is improved by first displaying an enlarged thumbnail of an original image and then subsequently displaying the resized original image. Now, the present invention will be described with reference to FIG. 1.

Figure 1:
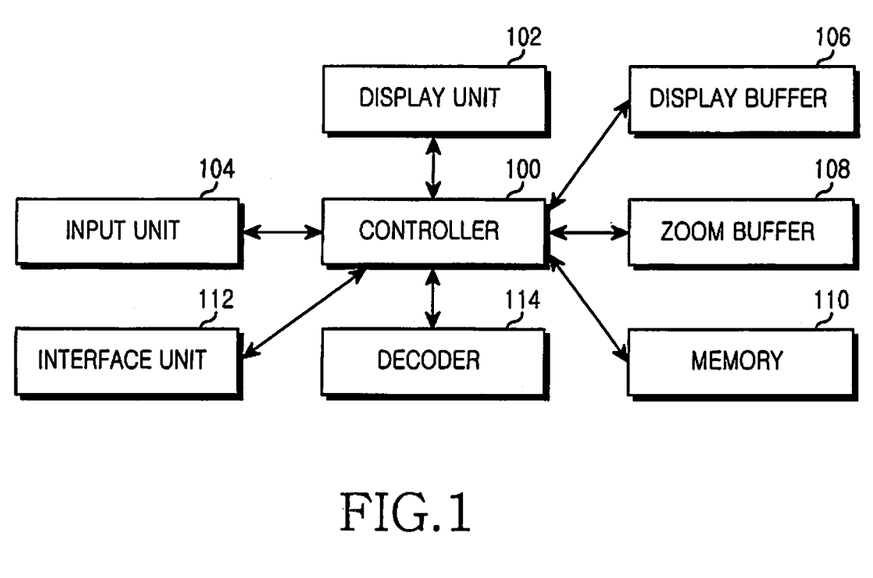
FIG. 1 is a block diagram of a portable terminal according to the present invention.

FIG. 1 is a block diagram of a portable terminal according to the present invention. Referring to FIG. 1, the portable terminal includes a controller 100, a display unit 102, an input unit 104, a display buffer 106, a zoom buffer 108, a memory 110, an interface unit 112, and a decoder 114.

The display unit 102 displays state information (or an indicator), numeral and alphabetical characters, moving pictures, still pictures, etc., each of which is produced when the portable terminal operates. The display unit 102 may be a color Liquid Crystal Display (LCD).

The input unit 104 receives a user input using a key pad or a touch screen. For example, a thumbnail may be enlarged to an image size chosen by a user by using the input unit 104.

The display buffer 106 temporarily stores an image to be displayed on the display unit 102.

The zoom buffer 108 stores an enlarged thumbnail. Further, the zoom buffer 108 temporarily stores an image of which quality has been improved using a decoding operation performed by the decoder 114.

The memory 110 stores a program for controlling an overall operation of the portable terminal, a java application program, and data (e.g., phone numbers, Short Message Service (SMS) messages, compressed images, videos, etc.).

The interface unit 112 functions as an interface between the portable terminal and the user. Upon receiving an image enlargement request through the input unit 104 while a thumbnail is being displayed, the thumbnail stored in the display buffer 106 is enlarged and stored in the zoom buffer 108, and the enlarged thumbnail is decoded by the decoder 114 for a better image quality. Upon receiving an image resize request from the user (or upon receiving an image update request from the decoder 114), during or after performing a process of improving the image quality, the image is resized to the image size chosen by the user or to a predetermined image size. The resultant image is stored in the display buffer 106. The display unit 102 displays the image stored in the display buffer 106.

An image quality improvement request is sent to the decoder 114 via the interface unit 112 so as to improve the image quality. Then, the user can send the image resize request using the input unit 104 while the decoding operation is being performed by the decoder 114.

The decoder 114 enlarges the thumbnail before the thumbnail is stored in the zoom buffer 108. The low-resolution thumbnail can be enlarged up to a zoom buffer size at which the decoder 114 can reduce image distortion. That is, the thumbnail can be enlarged up to the size of an original image of the thumbnail when the size of original image is less than or equal to the size of the zoom buffer.

Upon receiving the image enlargement request via the interface unit 112, the decoder 114 searches the memory 110 to find the compressed original image of the enlarged thumbnail stored in the zoom buffer 108. The compressed original image is then decoded. By performing this process, an image quality of the enlarged thumbnail stored in the zoom buffer 108 can be improved. The decoder 114 sends the image update request to the interface unit 112 after improving the image quality by a predetermined amount.

The decoder 114 resizes the enlarged image to the image size chosen by the user. In general, a time for reducing the image size is less than a time for enlarging the image size. Thus, since image resizing is frequently performed when viewing images in the portable terminal, an image is initially enlarged to its maximum size before being stored in the zoom buffer 108, and thereafter, the enlarged image shrinks according to a requested image size, and the shrunken image is stored in the display buffer 106. Accordingly, an image displaying process can be effectively performed because an image enlargement process, which typically takes a lot of time, is performed only once at an initial stage, and several image shrinking processes follow thereafter.

The controller 100 controls the interface unit 112 and the decoder 114. In addition, the controller 100 may function as the interface unit 112 and the decoder 114. Although these components 100, 112, and 114 are separately implemented in the present invention, the present invention is not limited thereto. Thus, in practice, all or part of the functions of the interface unit 112 and the decoder 114 may be performed by the controller 100.

Figure 2:
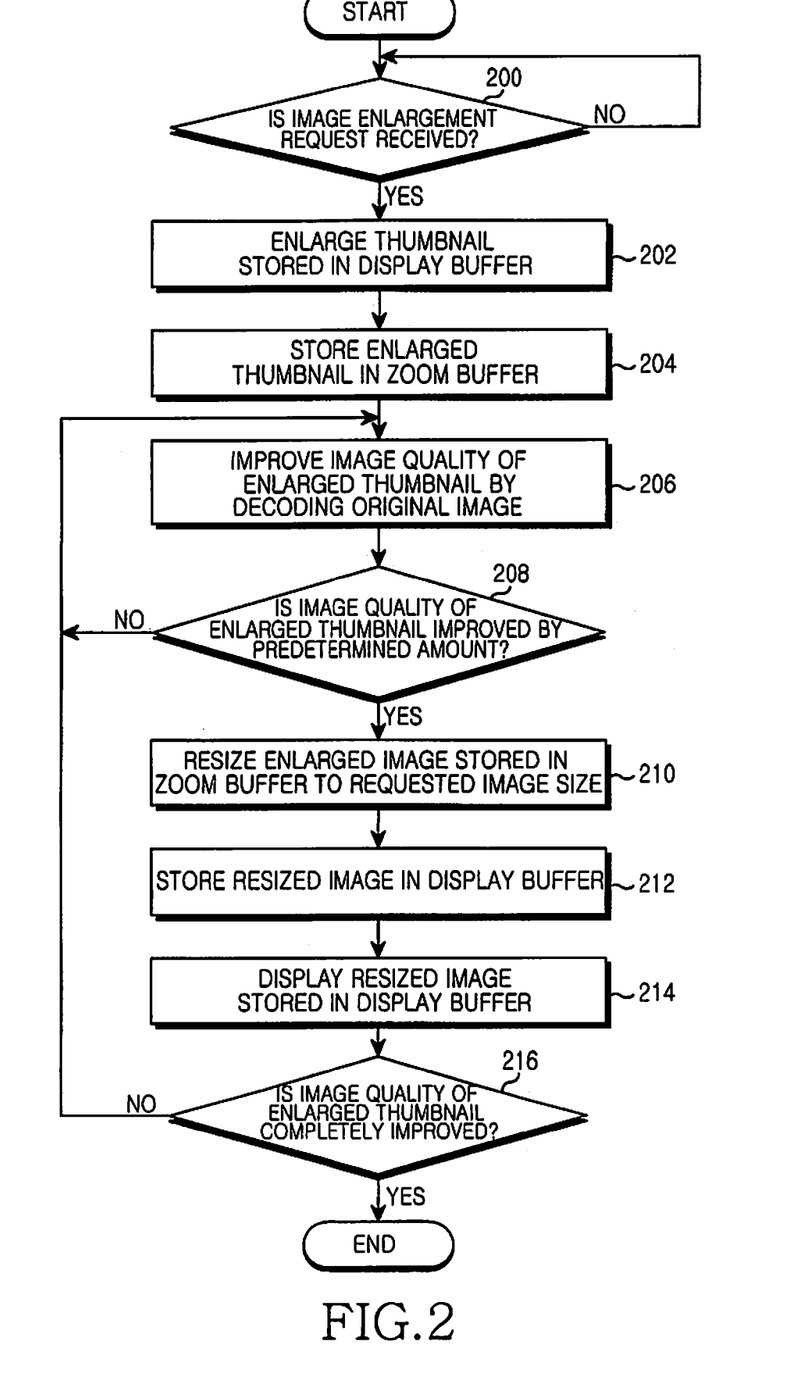
FIG. 2 is a flowchart illustrating an operation of enlarging and displaying an image in a portable terminal according to the present invention.

Now, a method of enlarging and displaying an image in a portable terminal of the present invention will be described with reference to the flowchart of. Referring to FIG. 2, upon detecting an image enlargement request in step 200, a thumbnail stored in the display buffer 106 is enlarged in step 202 up to a maximum image size at which the image quality can be improved by the decoder 114. In step 204, the enlarged thumbnail is stored in the zoom buffer 108, and this is informed to the decoder 114.

In step 206, the decoder 114 decodes a compressed original image of the thumbnail, which has been enlarged and stored in the zoom buffer 108, thereby improving the image quality of the enlarged thumbnail. In step 208, the decoder 114 determines whether the image quality has been improved by a predetermined amount.

If the image quality has not been improved by the predetermined amount in step 208, the procedure returns to step 206, and thus decoder 114 improves the image quality of the enlarged thumbnail until the image quality has been improved by the predetermined amount in step 208.

Then, in step 210, upon receiving the image update request from the decoder 114, during or after performing the image quality improving process, an image stored in the zoom buffer 108 is resized to the user requested image size. In step 212, the resized image is stored in the display buffer 106. In step 214, the resized image stored in the display buffer 106 is displayed on the display unit 102. In step 216, it is checked whether the quality of the enlarged thumbnail has been completely improved.

If the quality of the enlarged thumbnail has not been completely improved in step 216, the procedure returns to step 206 so that the decoder 114 continues to improve the image quality, and otherwise, the procedure is ended.

The user can recognize how much the image quality has been improved by using the predetermined amounts determine in step 208. The predetermined amount is initially set to 0%, and is displayed before the image quality of the enlarged thumbnail is improved.

The flowchart of FIG. 2 shows operations of both the interface unit 112 and the decoder 114 of the portable terminal. Now, operations of respective components of the portable terminal will be described with reference to FIGS. 3 and 4.

Figure 3:
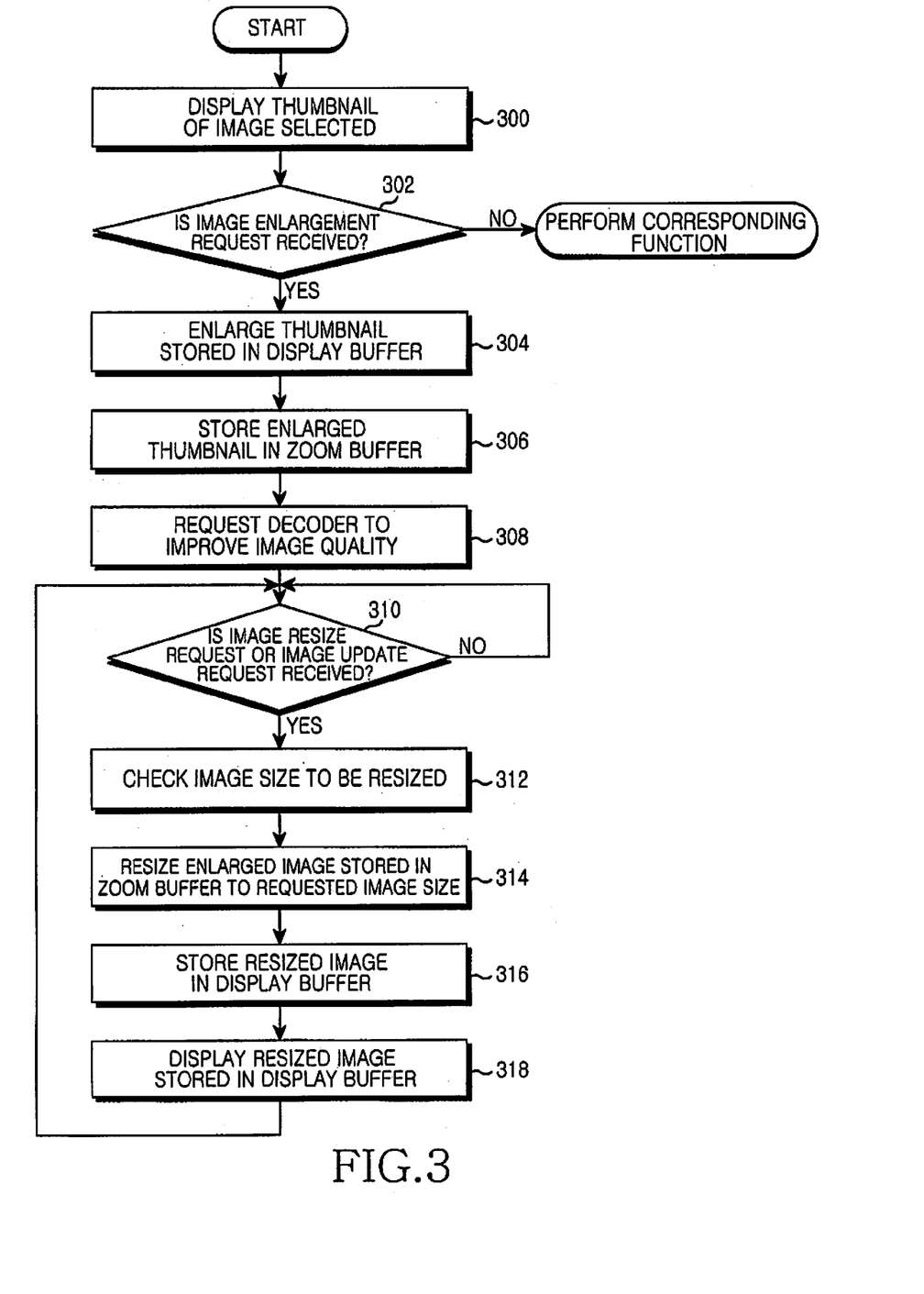
FIG. 3 is a flowchart illustrating an operation performed by an interface unit when an image is enlarged and displayed in a portable terminal according to the present invention.

FIG. 3 is a flowchart illustrating an operation performed by the interface unit 112 when an image is enlarged and displayed in a portable terminal according to the present invention. Referring to FIG. 3, in step 300, a thumbnail of an image selected by a user is displayed on the display unit 102. In step 302, it is checked whether an image enlargement request is received from the user. If the image enlargement request is not received, a corresponding operation is performed.

If an image enlargement request is received from the user in step 302, the thumbnail stored in the display buffer 106 is enlarged until the image size of the thumbnail reaches a maximum image size at which the image quality can be improved, in step 304. In step 306, the enlarged thumbnail is stored in the zoom buffer 108. In step 308, an image quality improvement request is sent to the decoder 114. In step 310, it is determined whether an image resize request has been received from the user or whether an image update request has been received from the decoder 114.

If an image resize request has been received from the user or an image update request has been received from the decoder 114 in step 310, the size of the image to be resized is checked, in step 312. In step 314, during or after performing the process of improving the image quality, the enlarged image stored in the zoom buffer 108 is resized to an image size checked in step 312. In step 316, the resized image is stored in the display buffer 106. In step 318, the resized image stored in the display buffer 106 is displayed on the display unit 102.

The size of the image to be resized in step 312 is the same as the size of an image most recently requested by the user. In the case where the user does not yet resize the image size, the size of the image to be resized is set to a default image size.

In step 310, both the user and the decoder 114 can invoke the image resize request. Thus, even when decoding is not finished by the decoder 114, the user can invoke the image resize request, so that the image quality can be partially improved. By doing so, the user does not have to wait until the decoding is finished.

Figure 4:
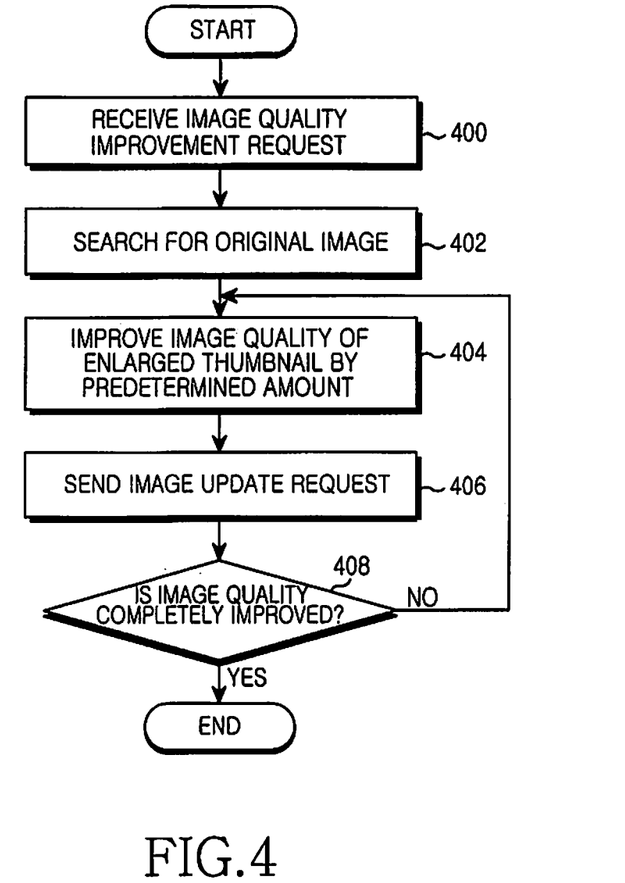
FIG. 4 is a flowchart illustrating an operation performed by a decoder when an image is enlarged and displayed in a portable terminal according to the present invention.

FIG. 4 is a flowchart illustrating an operation performed by the decoder 114 when an image is enlarged and displayed in a portable terminal according to the present invention.

Referring to FIG. 4, in step 400, an image quality improvement request is received via the interface unit 112 so as to improve the image quality of an enlarged thumbnail stored in the zoom buffer 108. Then, in step 402, the decoder 114 searches the memory 110 to find an original image of the enlarged thumbnail. In step 404, the image quality of the enlarged thumbnail is improved by a predetermined amount. In step 406, an image update request is sent to the interface unit 114. In step 408, it is checked whether the image quality of the enlarged thumbnail is completely improved.

If the image quality of the enlarged thumbnail is completely improved in step 408, the procedure is ended. If the image quality of the enlarged thumbnail is not completely improved in step 408, the procedure returns back to step 404, and steps 404 to 406 are repeated until the process of improving the image quality is done for the enlarged thumbnail.

Now, a process of improving an image quality after a thumbnail is enlarged and displayed will be described with reference to FIGS. 5A to 5F. FIGS. 5A to 5F are views for explaining a process of improving an image quality of a thumbnail enlarged and displayed in a portable terminal according to the present invention.

Figure 5A:
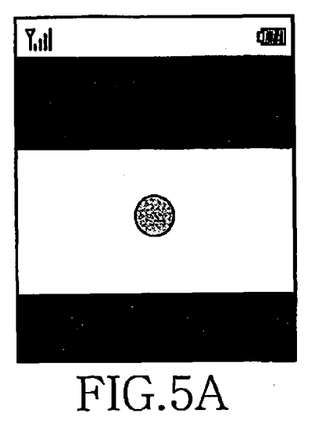
FIGS. 5A to 5F are views for explaining a process of improving an image quality of a thumbnail being enlarged to be displayed in a portable terminal according to the present invention.
Figure 5B:
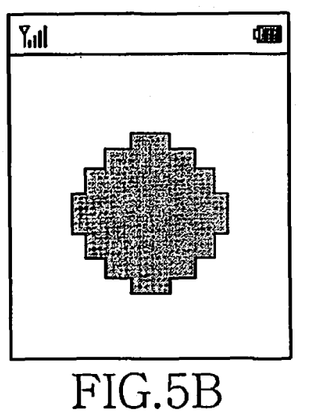
Figure 5C:
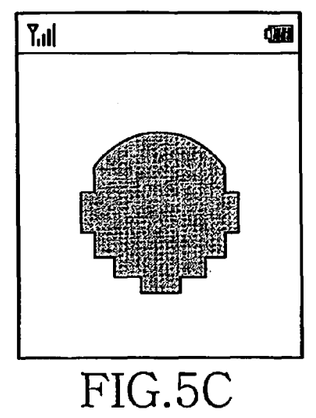
Figure 5D:
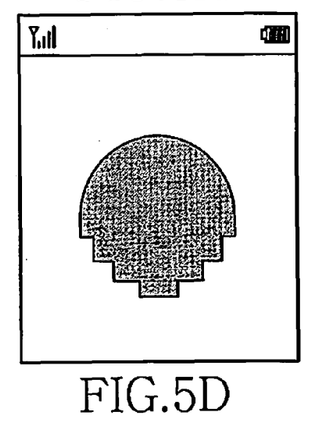
Figure 5E:
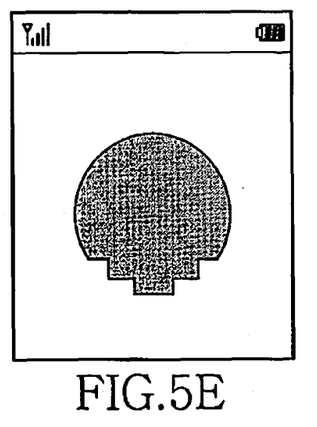
Figure 5F:
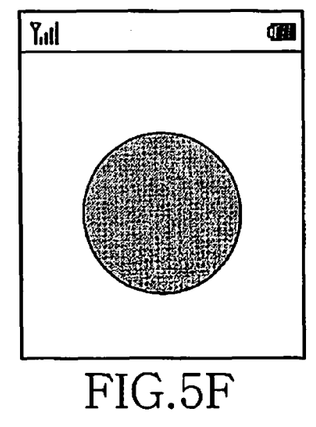

FIG. 5A shows a thumbnail of an image obtained by capturing a circle-shaped object. FIG. 5B shows a screen in which the thumbnail of FIG. 5A is enlarged when a predetermined amount of image quality improvement is set to 0%. In FIG. 5B, the original image is distorted such that the image has a stair-stepped shape along its circumference when the thumbnail of a low-resolution image is enlarged. FIG. 5C shows a screen in which the thumbnail of FIG. 5A is enlarged when the predetermined amount of image quality improvement is set to 25%, thereby partially improving the image quality. FIG. 5D shows a screen in which the thumbnail of FIG. 5A is enlarged when the predetermined amount of image quality improvement is set to 50%, thereby improving about half of the image quality. FIG. 5E shows a screen in which the thumbnail of FIG. 5A is enlarged when the predetermined amount of image quality improvement is set to 75%, thereby almost completely improving the image quality. FIG. 5F shows a screen in which the thumbnail of FIG. 5A is enlarged when the predetermined amount of image quality improvement is set to 100%, thereby completely improving the image quality.

Although the image quality of the enlarged thumbnail is sequentially improved from the top of the image to the bottom of the image in FIGS. 5A to 5F, the image quality may be improved in another direction when another decoding method is used.

According to the present invention, there is provided an apparatus and method for displaying an image whereby a user waiting time is reduced by separately performing a decoding operation from a user interface operation and whereby an image quality is improved by first displaying an enlarged thumbnail of an original image and then subsequently displaying the original image. Therefore, the user can view an image without having to wait a long time, since an image with a low-resolution is first displayed while the image is subject to a decoding process.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the invention has been shown and described with reference to a certain preferred embodiment thereof, it is a mere exemplary application. Thus, it will be understood by those skilled in the art that various changes in form and details may be made therein without departing from the spirit and scope of the invention as defined by the appended claims.

What is claimed is:

1. An apparatus for improving quality of an image displayed on a display unit of a portable terminal, the apparatus comprising:

a display buffer for storing a thumbnail of the image and displaying the stored thumbnail on the display unit;

a zoom buffer;

a memory in which an original image of the thumbnail is stored in a format of a compressed image file;

an interface unit for receiving an image enlargement request while the thumbnail is being displayed on the display unit and, upon receiving the image enlargement request, enlarging the thumbnail stored in the display buffer and storing the enlarged thumbnail in the zoom buffer, and sending an image quality improvement request to a decoder; and the decoder for performing a decoding operation to improve quality of the image being displayed on the display unit, wherein a requested image size is checked when an image resize request is received from a user, the enlarged thumbnail is resized to the checked image size, the resized thumbnail is stored in the display buffer, and the resized thumbnail is displayed, and wherein the decoding operation is performed independent from a user interface operation, the decoder commences the decoding operation before receiving the image resize request from the user, and the decoder continues the decoding operation until an image size of the thumbnail reaches a maximum image size to which image quality can be improved.

2. The apparatus of claim 1, wherein, after sending the image quality improvement request, the image quality of the enlarged thumbnail is improved by a predetermined amount of image quality improvement by using the original image and an image update request is received from the decoder via the interface unit.

3. The apparatus of claim 1, wherein, before being stored in the zoom buffer, the thumbnail is enlarged to an image size of the original image having the compressed image file format.

4. The apparatus of claim 1, wherein the independent operation of the interface unit from the decoder allows user input to be received while the decoder performs the decoding.

5. The apparatus of claim 2, wherein, after requesting improvement of the image quality of the enlarged thumbnail, displaying the enlarged thumbnail of which image quality has not been improved, followed by an image quality improvement process.

6. The apparatus of claim 2, wherein the predetermined amount of image quality improvement is used by the decoder to determine whether to continue a process of improving the image quality, and is determined through experimentation so that the user can recognize the improvement of the image quality.

7. The apparatus of claim 6, wherein, in improving the image quality of the enlarged thumbnail, the user selects the predetermined amount of image quality improvement as one of 0%, 25%, 50%, 75%, and 100%.

8. A method of improving quality of an image displayed on a display unit of a portable terminal, the method comprising:

storing, in a display buffer, a thumbnail of the image and displaying the stored thumbnail on the display unit;

receiving, by an interface unit, an image enlargement request while the thumbnail is displayed on the display unit;

upon receiving the image enlargement request, the interface unit enlarges the thumbnail stored in the display buffer and stores the enlarged thumbnail in a zoom buffer;

sending, by the interface unit to a decoder, an image quality improvement request to improve quality of the image being displayed on the display unit;

performing, by the decoder, a decoding operation to improve quality of the image being displayed on the display unit;

checking a requested image size when an image resize request is received from a user;

resizing the enlarged thumbnail to the checked image size;

storing the resized thumbnail in the display buffer; and displaying the resized thumbnail, wherein the decoding operation is performed independent from a user interface operation, wherein the decoder commences the decoding operation before receiving the image resize request from the user, and wherein the decoder continues the decoding operation until an image size of the thumbnail reaches a maximum image size to which image quality can be improved.

9. The method of claim 8, further comprising:

after receiving the image quality improvement request, searching for an original image of the enlarged thumbnail;

improving the image quality of the enlarged thumbnail by a predetermined amount using the original image; and sending an image update request to the interface unit.

10. The method of claim 9, wherein improving the image quality and sending the image update request are repeated until the image quality of the enlarged thumbnail is improved to the maximum image size to which image quality can be improved.

11. The method of claim 8, wherein the independent operation of the interface unit from the decoder allows user input to be received while the decoder is operating.

12. The method of claim 8, further comprising, after requesting improvement of the image quality of the enlarged thumbnail, displaying the enlarged thumbnail of which the image quality has not been improved, followed by an image quality improvement process.

13. The method of claim 9, wherein, in improving the image quality of the enlarged thumbnail, the predetermined amount is determined through experimentation so that the user can recognize the improvement of the image quality.

14. The method of claim 9, wherein, in improving the image quality of the enlarged thumbnail, the user selects the predetermined amount of image quality improvement as one of 0%, 25%, 50%, 75%, and 100%.

15. An apparatus for improving quality of an image displayed in a portable terminal, the apparatus comprising:

means for storing, in a display buffer, a thumbnail of the image and displaying the stored thumbnail on the display unit;

means for receiving an image enlargement request while the thumbnail is displayed;

means for, upon receiving the image enlargement request, enlarging the stored thumbnail stored in the display buffer and storing the enlarged thumbnail in a zoom buffer;

means for sending, by an interface unit to a decoder, an image quality improvement request to improve quality of the image being displayed;

means for performing a decoding operation to improve quality of the image being displayed;

means for checking a requested image size when an image resize request is received from a user;

means for resizing the enlarged thumbnail to the checked image size;

means for storing the resized thumbnail in the display buffer;

means for displaying the resized thumbnail, wherein the decoding operation is separately performed from a user interface operation, wherein the decoder commences the decoding operation before receiving the image resize request from the user, and wherein the decoder continues the decoding operation until an image size of the thumbnail reaches a maximum image size to which image quality can be improved.

16. The apparatus of claim 15, wherein the decoder comprises:

means for, after receiving an image quality improvement request, searching for an original image of the enlarged thumbnail;

means for improving the image quality of the enlarged thumbnail by a predetermined amount using the original image; and means for sending an image update request to the interface unit.

17. A non-transitory computer-readable medium having recorded thereon a program for improving quality of an image displayed in a portable terminal, the program comprising:

a first code segment for storing, in a display buffer, a thumbnail of the image and displaying the stored thumbnail on the display unit, for receiving an image enlargement request while the thumbnail is displayed, enlarging the stored thumbnail stored in the display buffer upon receiving an image enlargement request, and storing the enlarged thumbnail in a zoom buffer;

a second code segment for sending, by an interface unit to a decoder, an image quality improvement request to improve quality of the image being displayed;

a third code segment for performing a decoding operation to improve quality of the image being displayed and for checking a requested image size when an image resize request is received from a user;

a fourth code segment for resizing the enlarged thumbnail to the checked image size and for storing the resized thumbnail in the display buffer; and a fifth code segment for displaying the resized thumbnail, wherein the decoding operation is separately performed from a user interface operation, wherein the decoder commences the decoding operation before receiving the image resize request from the user, and wherein the decoder continues the decoding operation until an image size of the thumbnail reaches a maximum image size to which image quality can be improved.

18. The non transitory computer-readable medium of claim 17, wherein the program further comprises:

a sixth code segment for, after receiving an image quality improvement request, searching for an original image of the enlarged thumbnail;

a seventh code segment for improving the image quality of the enlarged thumbnail by a predetermined amount of image quality improvement using the original image; and an eighth code segment for sending an image update request to the interface unit.

* * * * *